June 16, 1964        J. J. O'CONNOR        3,137,799

THERMIONIC POWER SUPPLY

Filed April 30, 1962

INVENTOR.
JOHN J. O'CONNOR
BY
*Harold A. Levey, Jr.*
HIS ATTORNEY

3,137,799
THERMIONIC POWER SUPPLY
John Joseph O'Connor, Dorchester, Mass., assignor to General Electric Company, a corporation of New York
Filed Apr. 30, 1962, Ser. No. 192,028
7 Claims. (Cl. 310—4)

This invention relates to an electrical power supply and, in particular, to a power supply which employs a thermal-to-electrical energy converter to furnish an electrical power output for a predetermined period of time.

It is frequently desirable to provide an electrical power supply which is available to furnish the non-recurring energy requirements of an associated system for a short period of time. Such a power supply should have a long storage life and high reliability. In addition, the environment in which the power supply is to operate, e.g. an aircraft, missile, or space vehicle, may dictate a high-power-to-weight ratio. The prior art battery systems, with their associated filling and charging systems, and the prior art converters utilizing pressurized air and fuel systems have often failed to meet these requirements.

It is an object of the invention, therefore, to provide an improved electrical power supply.

It is another object of the invention to provide a short-life electrical power supply having an improved power-to-weight ratio, long storage life, and improved reliability.

It is a further object of the invention to provide a thermionic power supply wherein one portion of the thermal-to-electrical converter is maintained at a constant temperature in order to stabilize the temperature gradient through the converter during the period of operation of the power supply.

It is an additional object of the invention to provide a self-contained, short-life, thermionic power supply wherein the source of thermal energy and the thermal-to-electrical converter are combined into an integral unit.

Briefly stated, in accordance with the illustrated embodiment of the invention, a solid propellant cartridge and a thermal-to-electrical energy converter of annular design are assembled as an integral unit. The hot gases produced upon ignition of the propellant are caused to flow through the passage provided in the annular-shaped converter to provide an electrical output therefrom. The thermionic converter comprises a cathode positioned adjacent the passage, which is heated by the combustion gases, and an anode, spaced from the cathode. An ionized gas is furnished to the chamber between the electrodes from a reservoir. The anode and the reservoir are placed in thermal contact with materials having specific melting points and latent heats of fusion, the heats of fusion serving to maintain the anode and the reservoir at constant temperatures throughout the period of operation of the power supply. The resulting temperature gradient set up in the ionized gas between the anode and cathode causes a voltage to be developed therebetween. When a load is connected between the anode and cathode, the unit of the invention supplies power thereto for the duration of combustion of the propellant.

The subject matter of the invention is particularly pointed out and distinctly claimed in the concluding portion of the specification. The invention, however, both as to organization and method of operation, may best be understood by reference to the following description taken in connection with the accompanying drawing in which:

Figure 1:
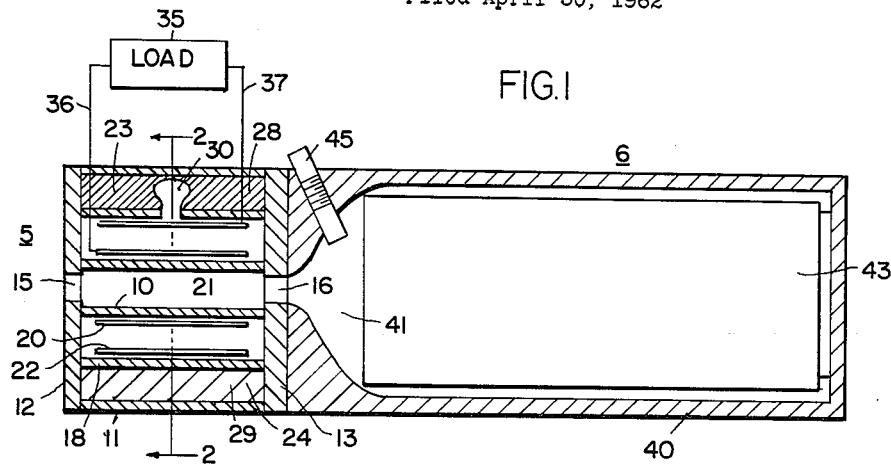
FIG. 1 is a longitudinal, cross-section of the thermionic power supply of the invention.

With reference to FIG. 1, a thermionic converter 5 and a propellant cartridge 6 are assembled to form an integral unit and function to provide a short-life power supply having a high power output-to-weight ratio and a long storage life. The inner cylindrical wall 10 and the outer cylindrical wall 11 are attached to the end walls 12 and 13 respectively and form therewith a chamber of annular cross-section. The end walls 12 and 13 have centrally located apertures 15 and 16 which communicate with the axial passage formed by the inner cylindrical wall 10. The annular chamber formed by the cylindrical walls 10 and 11 is subdivided into two concentric annular chambers by the intermediate wall 18 positioned between, and spaced from, the inner and outer walls 10 and 11.

A cathode 20 is mounted around the periphery of the inner cylindrical wall 10 in the interior of the inner annular chamber 21. In the embodiment of the invention shown, the cathode 20 may comprise a plurality of elements, as illustrated more clearly in FIG. 2. An anode 22 is mounted around the inner periphery of the intermediate wall 18 and disposed opposite the cathode 20 in the inner annular chamber 21. The anode 22 also may comprise a plurality of elements, corresponding to the cathode elements. Alternatively, a single element anode and cathode may be utilized. Employment of a plurality of elements to form the cathode and anode respectively permits serial connection of the elements of each electrode to obtain the power output at a higher potential. The potential developed between a pair of anode and cathode elements, which are formed of suitable materials as known in the art, is a function of the temperature differential between the electrodes and may, in the embodiment shown, be in the order of 0.5 volt.

Figure 3:
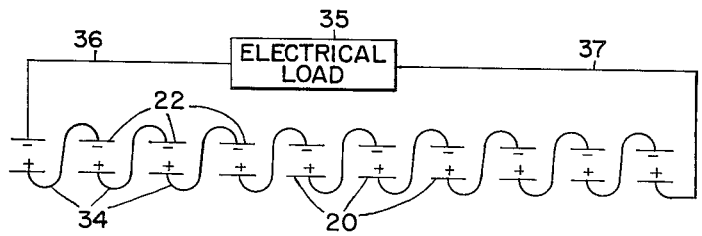
FIG. 3 is a circuit diagram showing the electrical interconnection of the anode and cathode elements of the power supply of FIG. 1.

An electrical load 35 may be connected between cathode 20 and anode 22 by means of lines 36 and 37. The potential developed between the anode and cathode is thus applied to the load 35 and produces a current therethrough to derive an electrical power output. The serial combination of the individual elements of the anode and cathode is shown schematically in FIG. 3. Conductors 34 serve to interconnect the respective elements of cathode 20 and anode 22 thereby to increase the potential applied, over the output lines 36 and 37, to the load 35.

Figure 2:
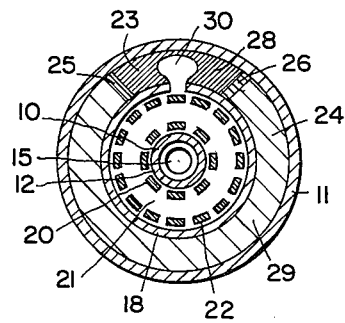
FIG. 2 is a cross-section taken along the plane 2—2 of FIG. 1.

The outer annular chamber formed between the intermediate wall 18 and the outer wall 11 is divided into two compartments 23 and 24 by members 25 and 26, as shown in FIG. 2, extending between the end walls 12 and 13. A reservoir 30 is positioned in compartment 23 of the outer annular chamber. The reservoir 30 contains an ionizable gas, for example cesium, and communicates with the inner annular chamber 21 containing the anode and cathode 20 and 22. The reservoir 30, therefore, provides the ionizable gas, necessary for conversion of heat energy to electrical energy, to the inner annular chamber 21.

In accordance with the invention, the compartments 23 and 24 of the outer annular chamber contain heat sink materials having specific melting points and latent heats of fusion so as to maintain the cesium reservoir 30 and the anode 20 at desired temperatures during operation of the power supply. For example, if it is desirable to maintain the cesium reservoir at a temperature of 300° C. in order to provide the proper pressure of cesium gas in the chamber 21, lead which has a melting temperature of 300° C. is placed in the compartment 23 surrounding the reservoir 30, as shown at 28 of FIGS. 1 and 2. Similarly, a desired anode temperature of 650° C. would dictate the use of a material such as aluminum, which has a melting temperature of 657° C., in the compartment 24, as shown at 29. Different applications may require selection of specific materials having desired melting temperatures and heats of fusion and may include materials such as those shown below:

| Material: | Melting temperature, ° C. |
|---|---|
| Ag-Sn (96% Sn) | 220 |
| Pb-Cd (36% Cd) | 240 |
| Pb | 300 |
| Al-Cu (66.2% Al) | 543 |
| Al-Si (11.2% Si) | 577 |
| Al | 657 |

The heat sink material chosen for the anode or reservoir must have a heat of fusion sufficient to maintain the anode or reservoir at the melting point temperature of the sink material throughout the period of operation of the power supply, i.e. the total quantity of heat reaching the heat sink material during operation should not exceed that quantity of heat required to melt the mass of heat sink material.

In accordance with the invention, a propellant cartridge 6 is integrally mounted with the converter 5. The propellant cartridge 6 has an outer shell 40 which may comprise, for example, titanium, and which is attached to the end wall 13 of converter 5. An opening is provided in that end of the shell 40 which contacts the end wall 13, the opening corresponding to the aperture 16 in the end wall 13 so that the interior chamber 41 of the shell 40 communicates with the passage formed by the inner cylindrical wall 10. A solid propellant cartridge 43 is positioned within the chamber 41. The quantity of solid propellant is chosen to correspond to the required operating time of the power supply which may, in the embodiment shown, be in the order of five minutes. The type of propellant is chosen so as to have the desired burning temperature and burning rate. In the embodiment shown, the desired combustion temperature is, for example, in the order of 3800° F. to provide a cathode temperature in the order of 2000° F. A supplementary charge of propellant separately ducted to the sink area may be incorporated into the propellant package initially to rapidly raise the heat sink materials to melting temperature upon initiation of the power supply operation.

Ignition of the propellant charge may be effected by a squibb type igniter 45 positioned in the shell 40. The squibb 45 may be a conventional pyrotechnic squibb igniter such as McCormick-Selph N–55, Model V, manufactured by McCormick Selph Associates, Hollister Airport, Hollister, California, or Hercules–S6E0, manufactured by Hercules Powder Company, Wilmington, Delaware.

In operation, upon ignition of the propellant cartridge 43 by means of the squibb 45, the hot gases of combustion flow, under self-developed pressure, through the opening in the shell 40 and the passage in the converter 5 formed by the inner cylindrical wall 10, and thence out the discharge aperture 15 in the end wall 12. The temperature of the cathode 20, mounted on the inner cylindrical wall 10, is thus raised in proprtion to the combustion temperature of the propellant. The high temperature of the combustion gases establishes a heat flux through the converter to the heat sink materials in the compartments 23 and 24, thus raising the heat sink materials to their melting temperatures. Upon reaching melting temperatures, the heats of fusion of the heat sink materials cause them to remain at their melting temperatures while passing through the solid-to-liquid phase, to provide thereby an almost uniform temperature gradient radially across the converter throughout its length. Thus, the volume and type of heat sink materials must be chosen so that the latent heats of fusion are not exceeded by the quantity of heat reaching the heat sink materials due to the heat flux through the converter during the operating time of the power supply. As previously described, a supplementary propellant charge may be employed initially to raise rapidly the heat sink materials to their melting temperatures in order to achieve maximum operating time under a stable temperature gradient in the converter.

The application of heat to the cesium reservoir 30 by the heat sink material in the compartment 23 causes the reservoir to supply ionized cesium gas to the chamber 21 at a desired pressure. The temperature gradient between the cathode 20, at a temperature approaching that of the combustion gases of propellant 43, and the anode 22, at substantially the melting temperature of the heat sink material in compartment 24, results in the generation of a potential difference between the electrodes. The cathode 20 becomes negative with respect to the anode 22. Thus, the generated potential is applied to load 35 and produces a current flow therethrough to provide an electrical energy output during the period of combustion of the propellant 43.

The self-contained power supply embodiment depicted in FIGS. 1 and 2, may be constructed having an outside diameter of 3½ inches and a length of 15 inches, with a total weight of approximately 10 lbs. The power output obtained during operation is then, for example, approximately 100 watts, thus giving a power output-to-weight ratio of 10 watts per pound. Prior art power supplies, such as pressurized air and fuel systems, have attained maximum power output-to-weight ratios in the order of one watt per pound. Improved storage life is also an advantage of the power supply of the invention. The thermionic converter has an indeterminate storage life while the solid propellant cartridge has a shelf life in the order of several years.

While there has been described what is at present considered to be a preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:
1. A thermionic generator comprising:
 (a) a source of hot gases under pressure,
 (b) a thermionic converter attached to said source of hot gases and adapted to convert the heat energy contained in the hot gases into electrical energy comprising:
  (1) an annular chamber having a passage therethrough coincident with the axis of the chamber,
  (2) means connecting the passage of said chamber to said source of hot gases,
  (3) a first electrode positioned within and adjacent the inner wall of said chamber and adapted to be heated by the hot gases flowing through the passage of said chamber,
  (4) a second electrode positioned within and adjacent the exterior wall of said chamber,
  (5) means for connecting an electric load between said first and said second electrodes,
  (6) a reservoir containing an ionizable gas communicating with said chamber,
  (7) means containing a first material surrounding said reservoir having a melting point and heat of fusion so as to maintain the reservoir at a desired temperature during the period of operation of said power supply, and
  (8) means containing a second material surrounding the exterior wall of said chamber having a melting point and heat fusion so as to maintain said second electrode at a desired temperature during the period of operation of said power supply.
2. The thermionic generator of claim 1 in which said first and said second electrodes comprise a plurality of serially connected elements.

3. The thermionic generator of claim 1 in which the ionizable gas container within said reservoir is cesium.

4. The thermionic generator of claim 1 in which said first material is lead.

5. The thermionic generator of claim 1 in which said second material is aluminum.

6. A thermionic generator comprising:
   (a) a first chamber,
   (b) a propellant contained within said chamber,
   (c) an outlet of one end of said chamber,
   (d) ignition means associated with said chamber and adapted to ignite said propellant,
   (e) a thermionic converter adapted to convert the heat energy released by said propellant upon ignition into electrical energy comprising:
      (1) a second annular chamber attached to said first chamber and having a passage therethrough coincident with the axis of said second chamber,
      (2) means connecting the passage of said second chamber to the outlet of said first chamber,
      (3) a first electrode positioned within and adjacent the inner wall of said second chamber and adapted to be heated by the hot combustion gases provided upon ignition of said propellant,
      (4) a second electrode positioned within and adjacent the exterior wall of said second chamber,
      (5) means for connecting an electric load between said first and said second electrodes,
      (6) a reservoir containing an ionizable gas communicating with said second chamber,
      (7) means containing a first material surrounding said reservoir having a melting point and heat of fusion so as to maintain the reservoir at a desired temperature during the period of combustion of said propellant, and
      (8) means containing a second material surrounding the exterior wall of said second chamber having a melting point and heat of fusion so as to maintain said second electrode at a desired temperature during the period of combustion of said propellant.

7. A thermionic generator comprising:
   (a) a chamber,
   (b) a propellant contained within said chamber and adapted to provide upon ignition hot combustion gases for a predetermined period,
   (c) an outlet at one end of said chamber,
   (d) ignition means associated with said chamber and adapted to ignite said propellant.
   (e) a thermal to electrical converter attached to said chamber and positioned adjacent said outlet and adapted to receive the hot combustion gases and to produce an electrical power outlet upon ignition of said propellant, and
   (f) means surrounding said converter and containing a material in contact therewith having a melting point and heat of fusion so as to maintain that portion of said converter contiguous with said material at a desired temperature during the period of combustion of said propellant.

References Cited in the file of this patent

UNITED STATES PATENTS

| | | |
|---|---|---|
| 2,759,112 | Caldwell | Aug. 14, 1956 |
| 2,935,846 | Neale | May 10, 1960 |
| 2,954,670 | Helus | Oct. 4, 1960 |
| 2,980,819 | Feaster | Apr. 18, 1961 |

FOREIGN PATENTS

| | | |
|---|---|---|
| 596,644 | Great Britain | Jan. 8, 1948 |